(12) United States Patent
Siol et al.

(10) Patent No.: US 8,765,889 B2
(45) Date of Patent: Jul. 1, 2014

(54) METHOD FOR PRODUCING HYBRID PARTICLES

(75) Inventors: Werner Siol, Darmstadt (DE); Klaus Langerbeins, Geesthacht (DE); Uwe Dietrich Kühner, Hamburg (DE)

(73) Assignee: Evonik Nanoresins GmbH, Geesthacht (DE)

( * ) Notice: Subject to any disclaimer, the term of this patent is extended or adjusted under 35 U.S.C. 154(b) by 0 days.

(21) Appl. No.: 13/502,342

(22) PCT Filed: Oct. 18, 2010

(86) PCT No.: PCT/EP2010/065635
§ 371 (c)(1),
(2), (4) Date: Jul. 9, 2012

(87) PCT Pub. No.: WO2011/045439
PCT Pub. Date: Apr. 21, 2011

(65) Prior Publication Data
US 2012/0322943 A1    Dec. 20, 2012

(30) Foreign Application Priority Data

Oct. 16, 2009    (EP) ..................... 09013118

(51) Int. Cl.
*C08L 33/04*    (2006.01)
*C08L 43/04*    (2006.01)

(52) U.S. Cl.
USPC ............ 526/194; 526/201; 524/457; 524/853

(58) Field of Classification Search
USPC .............. 106/78; 526/194, 201; 524/457, 853
See application file for complete search history.

(56) References Cited

U.S. PATENT DOCUMENTS

| 5,650,107 | A | 7/1997 | Vetter et al. |
| 6,136,912 | A | 10/2000 | Jacquinot et al. |
| 6,756,437 | B1 | 6/2004 | Xue et al. |
| 2004/0147029 | A1 | 7/2004 | Adam |
| 2005/0227077 | A1* | 10/2005 | Sugiyama ..................... 428/407 |
| 2010/0233060 | A1 | 9/2010 | Kühner et al. |
| 2011/0039983 | A1 | 2/2011 | Kühner |
| 2011/0040031 | A1 | 2/2011 | Langerbeins et al. |
| 2011/0046331 | A1 | 2/2011 | Langerbeins et al. |
| 2011/0112251 | A1 | 5/2011 | Langerbeins et al. |

FOREIGN PATENT DOCUMENTS

| DE | 36 32 215 A1 | 3/1988 |
| DE | 44 17 559 A1 | 11/1995 |
| EP | 0 460 560 A2 | 12/1991 |
| EP | 0 505 230 A1 | 9/1992 |
| EP | 0 703 192 A1 | 3/1996 |
| EP | 0 926 170 B1 | 6/1999 |
| EP | 1 216 262 B1 | 6/2002 |
| EP | 1 366 112 B1 | 12/2003 |
| EP | 2 025 722 A1 | 2/2009 |
| EP | 2 110 388 A1 | 10/2009 |
| EP | 2 110 389 A1 | 10/2009 |
| EP | 2 110 414 A1 | 10/2009 |
| EP | 2 110 415 A1 | 10/2009 |

OTHER PUBLICATIONS

Angewandte Makromolukulare Chemie 242 (1996), 105-122.
J. Brandrup, E.H. Immergut, Polymer Handbook 1st Edition, J. Wiley, New York, 1975.
T.G. Fox, Bull.Am.Phys. Soc. (Ser. 110, 1, 123 (1956).
Römpp Chemie Encyclopedia, 10th Edition, vol. 6 (1992), p. 4836.
J. Colloid Interface Sci 26:62 (1968).

* cited by examiner

*Primary Examiner* — Kelechi Egwim
(74) *Attorney, Agent, or Firm* — Henry M. Feiereisen LLP; Ursula B. Day

(57) ABSTRACT

The invention relates to a method for producing hybrid-particles containing polymer and $SiO_2$-particles, wherein a) in a first polymerization step in aqueous medium a water-insoluble phase containing one or more monomeric and colloidal $SiO_2$-particles having an average particle diameter of 1 to 150 nm are polymerized, and b) in a second polymerization step in aqueous medium one or more monomers are polymerized in the presence of the polymer obtained in the first polymerization step.

17 Claims, No Drawings

METHOD FOR PRODUCING HYBRID PARTICLES

CROSS-REFERENCES TO RELATED APPLICATIONS

This application is the U.S. National Stage of International Application No. PCT/EP2010/06535, filed Oct. 18, 2010, which designated the United States and which claims the priority of European Patent Application, Serial No. 09013118.6, filed Oct. 16, 2009, pursuant to 35 U.S.C. 119 (a)-(d).

BACKGROUND OF THE INVENTION

The invention relates to a method for producing hybrid particles based on nanoscale $SiO_2$ particles and on polymers, and to a dispersion which is obtainable by the method according to the invention.

Polyacrylates and polymethacrylates are long known in the prior art. They are used by way of example for producing plexiglass or so called acrylate rubbers.

Pure chemical crosslinked polyacrylates have only comparatively low strength. The mechanical properties of polymers can be improved by using fillers. Because acrylate ester groups are comparatively easy to saponify, there are only a few fillers that can be used with polyacrylates, an example being carbon black. However, carbon black impairs the transparency that is frequently desired in polyacrylates.

EP 1 216 262 describes a method for producing an aqueous dispersion of particles, which are composed of polymerizate and of fine inorganic solid.

EP 0 505 230 A1 describes mixed particles which are composed of a polymer matrix which in each case envelops an $SiO_2$ particle. *Angewandte Makromolekulare Chemie* 242 (1996) 105-122 describes the production of latex particles by emulsion polymerization of ethyl acrylate in the presence of functionalized and non-functionalized $SiO_2$ particles.

SUMMARY OF THE INVENTION

The invention is based on the problem of providing a method for producing hybrid particles which comprise polymer and nanoscale $SiO_2$ particles, wherein high-specification composite materials can be produced in an economical manner by the method.

Therefore, the subject of the present invention is to provide a method for producing a hybrid particle comprising polymer and $SiO_2$ particles, wherein a) a water-insoluble phase comprising one or more monomers and colloidal $SiO_2$ particles with an average particle size from 1 to 150 nm is polymerized in a first polymerization stage in an aqueous medium, and b) in a second polymerization stage in an aqueous medium, one or more monomers is/are polymerized in the presence of the polymer obtained in the first polymerization stage.

Both polymerization stages are carried out in a two-phase system made of water and of a water-insoluble phase, thereby preferably emulsifiers are used. The polymerizations preferably proceed by a free-radical mechanism, therefore it is optionally also possible to use corresponding initiators.

In the production method in, a first polymerization stage one or more monomers are polymerized in the presence of the nanoscale $SiO_2$ particles in a water-insoluble phase.

The $SiO_2$ particles are dispersed in the water-insoluble phase. The water-insoluble phase used in the polymerization can optionally also comprise organic solvents and other components, such as initiators or emulsifiers, alongside monomers and $SiO_2$ particles. In one embodiment, the water-insoluble phase substantially consists of monomer or of a mixture of monomer and organic solvent. Preferably, the water-insoluble phase substantially consists of monomer.

In a second polymerization stage, monomers are polymerized in an aqueous medium in the presence of the polymer obtained in the first polymerization stage. Optionally, the polymerization mixture also can also comprise other components, such as organic solvents, initiators, or emulsifiers, alongside the polymerizate of the first polymerization stage and monomer of the second stage.

Examples of organic solvents that can be used are ketones, aldehydes, alcohols, esters, ethers, aliphatic, aromatic, and halogenated hydrocarbons, as well as plasticizers. In one embodiment, the selection of the solvent is such that it can easily be removed at the end of the process. Preference is given to methanol, ethanol, isopropanol, toluene, xylene, pentane, hexane, heptane, octane, ethyl acetate, isopropyl acetate, butyl acetate, acetone, methyl ethyl ketone, methyl isobutyl ketone, and methoxypropanol. In another embodiment, the solvent is a long-chain alcohol, which can remain in the hybrid particle.

The first polymerization stage is preferably a suspension polymerization, particularly preferably a microsuspension polymerization process. By way of example, the monomers, a monomer-soluble initiator and the $SiO_2$ particles can be suspended in water and polymerized. The emulsification preferably takes place by using an emulsifier and under the action of high shear forces, for example via a high-speed mixer. Once emulsification has taken place, stirring can be continued at the same level or preferably at a lower speed. The polymerization is generally carried out at a temperature of from 20 to 150° C., preferably in the range from 30 to 100° C., particularly preferably between 50 and 90° C., for example as feed polymerization or batch polymerization. Preference is given to a batch polymerization.

In a preferred embodiment, a water-insoluble phase made of the monomers of the first stage, of the colloidal $SiO_2$ particles, and of an initiator soluble in said monomers is emulsified with water, preferably with the aid of an emulsifier, under the action of high shear forces, to give a fine-particle oil-in-water emulsion. The average size of the oil droplets is generally in the range from 100 to 5000 nm, preferably from 150 to 2000 nm, particularly preferably between 200 and 1500 nm, for example about 0.5 µm. Thereby, the particles are located in the water-insoluble phase. The resulting emulsion is brought to polymerization temperature and polymerized under the action of only small shear forces. Thereby, the polymerization temperature is generally in the range from 20 to 150° C., preferably in the range from 30 to 100° C., particularly preferably between 50 and 90° C.

Thereby, the selection of the monomer-soluble initiator depends on the selected polymerization temperature and on the monomers used. Preference is given to thermally decomposing initiators, such as organic peroxides and azo compounds, e.g. perketals, peroxides, and peresters:

t-butyl peroxypivalate $\tau_{1/2}$=1 h at 74° C.
t-butyl peroxy-2-ethylhexanoate $\tau_{1/2}$=1 h at 92° C.
Dilauroyl peroxide $\tau_{1/2}$=1 h at 80° C.
An example of an azo compound is azobisisobutyronitrile (AIBN).

Preference is given by way of example to the polymerization of the $1^{st}$ stage with dilauroyl peroxide as initiator and (meth)acrylic esters at about 80° C. Polymerization is carried out at elevated pressure in particular if gaseous monomers are used.

Examples of emulsifiers that can be used are anionic, cationic, amphoteric, and nonionic emulsifiers. Preference is given to anionic and nonionic emulsifiers, and in particular to anionic emulsifiers. Anionic emulsifiers include the sodium, potassium, and ammonium salts of fatty acids and sulfonic acids; the alkali metal salts of $C_{12}$-$C_{16}$-alkyl sulfates; ethoxylated and sulfated or sulfonated fatty alcohols; alkylphenols and sulfodicarboxylate esters. Nonionic emulsifiers include ethoxylated fatty alcohols and alkylphenols having from 2-150 ethylene oxide units per molecule. Cationic emulsifiers include ammonium, phosphonium, and sulfonium compounds having a hydrophobic moiety which by way of example is composed of one or more long alkyl chains. Preferred emulsifiers are alkylbenzenesulfonates, dialkyl sulfosuccinates, Na $C_{14}$-$C_{16}$-alkylsulfonates salt, and Na dodecyl sulfate salt. The emulsifiers produced via ethoxylation and sulfation of alkylphenols have particularly good suitability. Examples are the derivatives of nonylphenol or triisobutylphenol having from 5 to 10 ethylene oxide units, e.g. 6-fold-ethoxylated triisobutylphenol, sulfated Na salt. The emulsifiers are typically used in concentrations from 0.02 to 5% by weight, preferably from 0.1 to 2% by weight, based on the monomers.

Generally, in the first polymerization stage results in a suspension which comprises polymer particles suspended in water and $SiO_2$ particles comprised therein.

The polymer obtained in the first polymerization stage is then used in the second polymerization stage. Thereby, the polymerization mixture obtained in the first stage preferably is subjected directly to further use, e.g. by adding the components of the second polymerization stage directly to the reaction vessel in which the polymerization mixture of the first polymerization stage is present.

Thereby, in one embodiment, the polymer of the first polymerization stage forms a water-insoluble phase, which can optionally also comprise organic solvents and other components, such as initiators or emulsifiers, alongside monomer of the second stage.

In a preferred embodiment, the second polymerization stage is an emulsion polymerization. By way of example, an aqueous emulsion in which the monomers, an emulsifier, and optionally a water-soluble initiator are comprised can be added to the polymer obtained in the first polymerization stage. The polymerization process can take place as a feed polymerization (semicontinuous polymerization) or as a batch polymerization, wherein single or multiple batchwise addition is possible. A feed polymerization is preferred.

In another embodiment, an emulsion is added at polymerization temperature to the suspension obtained in the first polymerization step, which can be produced from the monomers, water, emulsifier, and optionally a water-soluble initiator, under the action of high shear forces. The feed is preferably controlled in such a way that in each case the monomer is present in the reaction mixture only small amounts, e.g. as so called feed polymerization. In another embodiment, monomer and an aqueous solution of an initiator, which can also comprise emulsifier, are metered separately.

In another embodiment, the monomers of the second polymerization stage are metered, without further initiator, into the polymerization mixture which is present in the reaction vessel and derives from the first polymerization stage, and are polymerized in the presence of remaining initiator still present from the first polymerization stage. It can also be advantageous to start the addition of the monomers of the second polymerization stage already when the monomers of the first polymerization stage are polymerized only to an extent of 80 to 95% by weight.

If initiator is added for the second polymerization stage, a water-soluble initiator is generally used for this purpose. Examples of water-soluble initiators are alkali metal persulfates, ammonium persulfate, and hydrogen peroxide. Preference is given to the use of peroxodisulfates as initiator, an example being potassium peroxodisulfate. Redox initiators can also be used, comprising alongside an oxidizing component, e.g. ammonium peroxodisulfate, a reducing component, e.g. bisulfite, Rongalit, or tertiary aromatic amines. The amount of initiator is preferably in the range from 0.01 to 2% by weight, based on the monomers.

The temperature at which the polymerization is carried out is generally from 20 to 150° C., preferably in the range from 30 to 100° C., and particularly preferably between 50 and 90° C. Polymerization is carried out at elevated pressure in particular when gaseous monomers are used.

Chain-transfer agents, such as alkanethiols or esters of thioglycolic acid, e.g. 2-ethylhexyl thioglycolate, can be used to adjust molecular weight in polymerization step 1 and 2, in particular in polymerization step 2.

In a preferred embodiment taking the form of a feed polymerization process, an aqueous emulsion comprising the monomers, an emulsifier, and a water-soluble initiator is added to the polymer obtained in the first polymerization stage.

Examples of emulsifiers that can be used for the second polymerization stage are anionic, cationic, amphoteric, or nonionic emulsifiers. Preference is given to anionic and nonionic emulsifiers, in particular to anionic emulsifiers. Anionic emulsifiers include sodium, potassium, and ammonium salts of fatty acids and sulfonic acids; the alkali metal salts of $C_{12}$-$C_{16}$-alkyl sulfates; ethoxylated and sulfated or sulfonated fatty alcohols; alkylphenols and sulfodicarboxylate esters. Nonionic emulsifiers include ethoxylated fatty alcohols and alkylphenols having from 2-150 ethylene oxide units per molecule. Cationic emulsifiers include ammonium, phosphonium, and sulfonium compounds having a hydrophobic moiety which by way of example is composed of one or more long alkyl chains. Preferred emulsifiers are alkylbenzenesulfonates, dialkyl sulfosuccinates, Na $C_{14}$-$C_{16}$-alkylsulfonates salt, and Na dodecyl sulfate salt. The emulsifiers produced via ethoxylation and sulfation of alkylphenols have particularly good suitability. Examples are the derivatives of nonylphenol or triisobutylphenol having from 5 to 10 ethylene oxide units, e.g. 6-fold-ethoxylated triisobutylphenol, sulfated Na salt. The emulsifiers are typically used in concentrations from 0.02 to 5% by weight, preferably from 0.1 to 2% by weight, based on the monomers.

If in the first polymerization stage anionic or nonionic emulsifiers are used, it is particularly preferable that anionic or nonionic emulsifiers are also used in the second polymerization stage. It is particularly preferable that the same class of emulsifier is used in the second polymerization stage as in the first polymerization stage, e.g. anionic emulsifiers in both stages.

The polymers obtained in the method according to the invention can be homopolymers or copolymers, preferably copolymers. The reaction conditions, in particular the type of the monomers, are preferably selected in such a way that the polymer (polymer A) formed in the first polymerization stage differs from the polymer (polymer B) formed in the second polymerization stage.

The polymers A and B can differ from one another by way of example in respect of their chemical constitution, their chemical nonuniformity, their tacticity, their glass transition temperature, their molecular weight, and/or their degree of crosslinking. The polymers A and B preferably differ in their monomer constitution. Thereby, the polymers can differ from one another in the monomers comprised or—if the same monomers are present in each case—in the proportions of the respective monomers.

Preferred monomers used in the method according to the invention are vinyl monomers. A vinyl monomer is a monomer which comprises an ethylenically unsaturated C—C bond, which is preferably terminal. Preferably, the vinyl monomers may be polymerized free-radically.

Examples of vinyl monomers that can be used are dienes, such as isoprene or butadiene, vinyl halides, such as vinyl chloride, vinyl esters, such as vinyl acetate and vinyl esters of α-branched monocarboxylic acids, styrene and substituted styrenes, acrylic and methacrylic acid and derivatives thereof, e.g. esters of (meth)acrylic acid, (meth)acrylonitriles, and (meth)acrylic anhydrides. Acrylic and methacrylic esters preferably have from 1 to 18 carbon atoms, more preferably from 1 to 12 carbon atoms, in the alkyl chain. The alkyl chain can be linear or branched and can have other functionalities, e.g. amino groups or alcohol groups.

Examples of vinyl monomers are methyl acrylate, ethyl acrylate, n-propyl acrylate, n-butyl acrylate, isobutyl acrylate, sec-butyl acrylate, tert-butyl acrylate, n-hexyl acrylate, ethylhexyl acrylate, isobornyl acrylate, methyl methacrylate, ethyl methacrylate, n-butyl methacrylate, isobutyl methacrylate, tert-butyl methacrylate, n-hexyl methacrylate, isobornyl methacrylate, acrylonitrile, methacrylonitrile, styrene, 1,3-butadiene, 1,2-butadiene, isoprene, vinyl acetate, vinyl propionate, vinyl chloride, vinylidene chloride, acrylic acid, methacrylic acid, acrylamide, methacrylamide, acrylic anhydride, methacrylic anhydride, 2-hydroxyethyl acrylate, 2-hydroxyethyl methacrylate, hydroxypropyl acrylate, propylene glycol methacrylate, butanediol monoacrylate, ethyldiglycol acrylate, dimethylaminoethyl acrylate, dinnethylaminoethyl methacrylate, N-(3-dimethylaminopropyl)methacrylamide, diethylaminoethyl acrylate, tert-butylaminoethyl methacrylate, 2-chloroacrylonitrile, N-hydroxymethylacrylamide, N-hydroxymethylmethacrylamide, 2-sulfoethyl methacrylate, 2-acrylamido-2-methylpropanesulfonic acid, fumaric acid, maleic acid, crotonic acid, itaconic acid, glycidyl methacrylate, diacetoneacrylamide, diacetonemethacrylamide, acrylamidoglycolic acid, methylacrylamidoglycol methyl ether.

Particularly preferred acrylate monomers are methyl acrylate, butyl acrylate, ethyl acrylate, and ethylhexyl acrylate. A particularly preferred methacrylate monomer is methyl methacrylate (MMA). PVC and copolymers of styrene with acrylonitrile (SAN) are of particular interest, too. Styrene can be used as comonomer in order to alter the refractive index of polymer A or polymer B.

Preferred polymers obtained in the method according to the invention are vinyl polymers, particularly preferably selected from the group of the polymers based on dienes, such as isoprene or butadiene, on vinyl halides, such as vinyl chloride, on vinyl esters, such as vinyl acetate, and on vinyl esters of α-branched monocarboxylic acids, on styrene and substituted styrenes, on acrylic and methacrylic acids, and on derivatives thereof, e.g. esters of (meth)acrylic acid, (meth)acrylonitriles and (meth)acrylic anhydrides. Particularly preferred polymers are polymers of esters of acrylic acid and methacrylic acid.

Polymer A is preferably a copolymer made of a first monomer with a copolymerization parameter $r_1>1$ and of a second monomer with a copolymerization parameter $r_2<0.8$.

In another preferred embodiment, polymer A is a copolymer comprising units of vinyl acetate or esters of acrylic acid and methacrylic acid, in particular a copolymer based on methyl acrylate, ethyl acrylate, butyl acrylate, and/or ethylhexyl acrylate, very particularly preferably a copolymer of one or more of said monomers with MMA.

Polymer A is more preferably a butyl acrylate-methyl methacrylate copolymer. The ratio by weight of butyl acrylate units to methyl methacrylate units is preferably in the range from 10:1 to 1:2 in the copolymer A.

Polymer B is preferably a copolymer made of a first monomer with a copolymerization parameter $r_1>1$ and of a second monomer with a copolymerization parameter $r_2<0.8$.

In another preferred embodiment, polymer B is a polymer based on MMA, in particular in combination with methyl acrylate, ethyl acrylate, butyl acrylate, and/or ethylhexyl acrylate. The ratio by weight of acrylate units to methyl methacrylate units in the copolymer B is preferably in the range from 2:1 to 1:100. It is likewise preferable that the vinyl polymer B comprises subordinate amounts of polar vinyl monomers, e.g. (meth)acrylic acid, (meth)acrylamide, hydroxyethyl(meth)acrylate, and hydroxypropyl(meth)acrylate, e.g. that vinyl polymer B comprises amounts of from 0.1 to 5% by weight, preferably from 0.5 to 2% by weight, of (meth)acrylic acid units. For some application, vinyl polymers B based on vinyl chloride are of interest.

In a preferred embodiment, the hybrid particle produced according to the invention comprises at least two polymers (polymer A and polymer B) which differ from one another, for example polymers of esters of acrylic acid and esters of methacrylic acid, of styrenes, and/or of vinyl esters, which have glass transition temperatures $T_g$ differing from one another. The glass transition temperature $T_g$ of polymer A is usually in the range from −100° C. to +100° C., preferably in the range from −80° C. to +50° C. In contrast, the glass transition temperature $T_g$ (calculated from the Fox equation or measured) of polymer B is preferably at least 20° C. higher in comparison with polymer A.

The expression glass transition temperature $T_g$ relates to the glass transition temperature of the polymers comprised in the hybrid particles produced according to the invention. The glass transition temperatures of any homopolymers are known and are listed by way of example in J. Brandrup, E. H. Immergut, Polymer Handbook $1^{st}$ Ed. J. Wiley, New York, 1975. The glass transition temperature of a copolymer can be calculated from the so called Fox equation (T. G. Fox, Bull. Am. Phys. Soc. [Ser. II], 1, 123 [1956]). Glass transition temperatures are usually measured by DSC (Differential Scanning calorimetry) or by DMTA (Dynamic Mechanical Thermal Analysis).

Particular advantages arise if polymer A and polymer B are at least partially compatible with one another, i.e. are at least partially miscible with one another. This is the case by way of example for polymers A and B which have at least one monomer in common. Examples are copolymers A and B made of methacrylic acid esters (monomer 1) and of acrylic acid esters (monomer 2) with copolymerization parameters which are usually $r_1>2$ and $r_2<0.6$. An example of copolymers A and B partially compatible is a composition of: vinyl polymer A (batch polymerization) having 30% by weight of MMA, and 70% by weight of butyl acrylate; and vinyl polymer B (feed polymerization) having 50% by weight of MMA and 50% by weight of butyl acrylate. For the purposes of the invention it is preferable that polymer A and polymer B partially interpenetrate one another physically.

Polymer A preferably forms a polymer network. This polymer A network comprises the nanoscale $SiO_2$ particles either physically included, and in this case the crosslinking can take place by way of conventional crosslinking agents, or chemically linked in the form of crosslinking agents. Preference is given to crosslinking via polymerizable groups, e.g. methacrylate groups, on the surface of the $SiO_2$ particles. In this case it is preferable to use no conventional crosslinking agents.

The expression conventional crosslinking agents denotes low-molecular-weight (preferably monomeric) molecules having at least two polymerizable double bonds which can link initially linear or branched macromolecular networks to three-dimensional polymer networks. Conventional crosslinking agents have been defined by way of example in Römpp Chemie-Lexikon [Römpp Chemical Encyclopedia], $10^{th}$ edition, volume 6, page 4836. Examples of these crosslinking agents are allyl acrylate, allyl methacrylate, ethylene glycol diacrylate, diethylene glycol diacrylate, triethylene glycol diacrylate, tetraethylene glycol diacrylate, butanediol diacrylate, hexanediol diacrylate, neopentyl glycol diacrylate, trimethylolpropane triacrylate, tripropylene glycol diacrylate, tricyclodecanyl diacrylate, tricyclodecanyl dimethacrylate, N,N-methylenebisacrylamide and N,N-methylenebismethacrylamide.

When $SiO_2$ particles having crosslinking effect are used, the production of polymer A preferably uses no, or at most a small amount (at most 2% by weight) of conventional crosslinking agent molecules, preferably at most 1% by weight, more preferably at most 0.5% by weight, more preferably at most 0.2% by weight. In a preferred embodiment, the polymerizable composition comprises no technically relevant amounts of conventional crosslinking agent molecules. The crosslinking agent function is assumed exclusively by the superficial groups of the $SiO_2$ particles. Within the invention it is also possible to additionally use very small amounts of conventional crosslinking agents, preferably of graft-linking agents, such as allyl methacrylate, in order to modify the network.

It is also preferable that the polymer network comprises the nanoscale $SiO_2$ particles homogeneously distributed, i.e. that the number of $SiO_2$ particles per unit volume (or in micrographs of sections: per unit area) is substantially identical within those regions of the hybrid particle that comprise polymer A. Thereby, the dimension of the material examined here is generally at least 8 times the size of the $SiO_2$ particles. This means that most of the $SiO_2$ particles within the network do not form domains. Examples of these domains would be shells made of $SiO_2$ particles around a polymer core which comprises few to no $SiO_2$ particles, or accumulations of $SiO_2$ particles surrounded by polymer and having no, or only a few, $SiO_2$ particles present between them. In such accumulations the individual $SiO_2$ particles may also be present in non-agglomerated and/or non-aggregated form.

Polymer A is generally a high-molecular-weight polymer, even without crosslinking. The internodal length from crosslinking point to crosslinking point can be controlled by way of the quantitative ratio of crosslinker molecule to monomers A, and the chain length by way of the amount of initiator. The general rule is: as the amount of crosslinking agent or initiator decreases, the internodal lengths increase or the polymer chains become longer; as the internodal distances increase, the network becomes more extensible.

In one preferred embodiment, polymer B is capable of crosslinking the hybrid particles produced according to the invention to one another. This involves a chemical and/or physical crosslinking. Crosslinking means the construction of a three-dimensional network (see, for example, Römpp Chemie Lexikon [Römpp Chemical Encyclopedia], $9^{th}$ edition, volume 6 (1992), p. 4898).

When the hybrid particles are crosslinked, a large number of individual particles form bonds to one another via the vinyl polymer B to a network. Examples therefore are the formation of a film from a dispersion of the hybrid particles, e.g. via removal of the dispersion medium, or the production of a workpiece from a powder or from a dispersion of individual hybrid particles, e.g. via extrusion.

Examples of chemical crosslinking are the formation of covalent, coordinative, or ionic bonds. In the case of physical crosslinking of the hybrid particles, formation of a network takes place by way of domains within the polymer network. These domains can be crystalline or amorphous regions below the glass transition temperature. It is preferable that the crosslinking takes place by way of amorphous domains. Physical crosslinking can by way of example be produced by bringing the hybrid particles into immediate contact with one another (e.g. via removal of the water from an aqueous dispersion of the hybrid particles), wherein the polymer chains of polymers B of various hybrid particles physically interpenetrate one another reciprocally (e.g. so called interpenetration networks) and thus lead to stable linkage. Physical crosslinking within the polymer material can be discerned by the presence of a continuous polymer phase which is substantially free of $SiO_2$ particles and located between the domains of polymer A comprising $SiO_2$ particles. Vinyl polymers B preferably suitable for the crosslinking process have good film-forming properties.

The physical and the chemical crosslinking of the hybrid particles can be combined. By incorporating reactive groups in polymer B, it is possible by way of example, after the formation of the material via physical crosslinking, also to carry out chemical crosslinking. Examples of suitable comonomers in polymer B are N-methylolacrylamide and N-methylolmethacrylamide, which crosslink by condensation, or (meth)acrylic acid, which can crosslink by way of salt formation.

Preference is given to physical crosslinking. If chemical crosslinking should be carried out, it is preferable to crosslink physically first.

Preferably, polymer B is not crosslinked in the isolated hybrid particle, in particular not chemically crosslinked. Polymer B preferably is a polymer with a molar mass $M_w$ in the range from 10,000 to 5,000,000 g/mol, preferably in the range from 50,000 to 1,000,000 g/mol. Moreover, preferably at least >30% by weight of polymer B is of high molar mass (e.g. >50,000 g/mol, preferably >100,000 g/mol) and has not been crosslinked. As far as polymer B does not penetrate into polymer A, polymer B is substantially free of $SiO_2$ particles.

In a preferred embodiment, the present invention provides a method for producing a hybrid particle comprising a polymer A, in particular a vinyl polymer, which is chemically crosslinked by way of reactively surface-modified, colloidal $SiO_2$ particles with an average particle size from 1 to 150 nm, and a polymer B which is not chemically crosslinked, in particular a vinyl polymer which is capable of crosslinking hybrid particles with one another, preferably crosslinking them physically.

It is preferable that the ratio by weight of polymer A to polymer B is in the range from 10:1 to 1:2, preferably from 5:1 to 1:1, particularly preferably in the range from 3:1 to 1.5:1.

It is preferable that the water absorption of polymer B is higher than that of polymer A. It is preferable that polymer B comprises from 0.1 to 5% by weight of hydrophilic groups, e.g. salts of methacrylic acid and/or hydroxyethyl acrylate and/or adhesion-promoting groups, or hydrophilic moieties from the water-soluble initiators, for example —SO$_4$H in K$_2$S$_2$O$_8$.

The average particle size of the SiO$_2$ particles used in the method according to the invention is generally from 1 to 150 nm. Preferred lower limits for the average size of the SiO$_2$ particles are 2 nm, 3 nm, 4 nm, and 5 nm. Preferred upper limits are 100 nm, 75 nm, 50 nm, 30 nm, and 25 nm.

The particle size can be determined in solution by means of dynamic light scattering on a "Dynamic Light Scattering Particle Size Analyzer LB-550" from Horiba company at a concentration of 10% by weight maximum of particles, wherein the maximum permissible dynamic viscosity of the dispersion at 25° C. is 3 mPas. The particle size stated is the median (D50 value) of the particle size distribution.

The particle size can be determined in the solid phase by transmission electron microscopy. For this, measurements of at least 100 SiO$_2$ particles are measured and a particle size distribution is calculated.

The SiO$_2$ particles are present in colloidal form, i.e. the nanoscale silicon dioxide is generally present as at least 50% of separate, non-aggregated and non-agglomerated primary particles. Unlike aggregates and agglomerates, the primary particles have spherical shape. Other preferred lower limits are 70%, 80%, 90%, 95%, and 98%. These percentages are % by weight. Therefore, the invention preferably provides a method for producing hybrid particles which are substantially free of aggregates and/or agglomerates of the SiO$_2$ particles.

The SiO$_2$ particles can be surface-modified or non-surface-modified. Preference is given to SiO$_2$ particles, which are surface-modified by way of example via reactive or unreactive groups. Particular preference is given to surface-functionalized SiO$_2$ particles which bear polymerizable groups as reactive groups on the surface. In particular, the polymerizable groups on the surface of the SiO$_2$ particles can comprise vinyl groups, allyl groups, hexenyl groups, acryloyl groups, and/or methacryloyl groups.

For the surface modification, the corresponding groups can by way of example be bound chemically to the surface of the SiO$_2$ particles via suitable silanization. Suitable silanes are preferably those selected from the group consisting of organosilanes of the formula $R^1_a SiX_{4-a}$, organosilanes of the formula $(R^1_3Si)_b NR^1_{3-b}$, and organosiloxanes of the formula $R^1_n SiO_{(4-n)/2}$, in which each $R^1$ is selected independently of the others from hydrocarbon moieties having from 1 to 18 carbon atoms or organofunctional hydrocarbon moieties having from 1 to 18 carbon atoms, or is a hydrogen atom, each X is selected independently of the others and is a hydrolyzable group, a=0, 1, 2, or 3, b=1, 2, or 3, and n is a number from 2 to, and inclusive of, 3. Examples of hydrolyzable groups are halogen, alkoxy, alkenoxy, acyloxy, oximino, and aminoxy groups.

Examples of functional, nonhydrolyzable groups are vinyl, aminopropyl, chloropropyl, aminoethylaminopropyl, glycidyloxypropyl, mercaptopropyl, and methacryloxypropyl groups. Suitable are by way of example alkoxysilanes, silazanes, and halosilanes. Examples that may be mentioned of silanes which can be used to bond polymerizable groups to the surface of the SiO$_2$ particles are vinyltrimethoxysilane, vinyltriethoxysilane, methylvinyldimethoxysilane, methylvinyldiethoxysilane, vinyldimethylmethoxysilane, vinyldimethylethoxysilane, divinyldimethoxysilane, divinyldiethoxysilane, vinyltriacetoxysilane, vinyltrichlorosilane, methylvinyldichlorosilane, dimethylvinylchlorosilane, divinyldichlorosilane, vinyltris(2-methoxyethoxy)silane, hexenyltrimethoxysilane, 3-methacryloxypropyltrimethoxysilane, 3-methacryloxypropyltriethoxysilane, 3-methacryloxypropyltriacetoxysilane, methacryloxymethyltrimethoxysilane, methacryloxymethyltriethoxysilane, (methacryloxymethyl)methyldimethoxysilane, (methacryloxymethyl)methyldiethoxysilane, acryloxypropyltrimethoxysilane, acryloxypropyltriethoxysilane, 3-methacryloxypropyltrichlorosilane, 3-methacryloxypropyldimethylchlorosilane, vinylbenzylethylenediamino propyltrimethoxysilane, vinylbenzylethylenediaminopropyltrimethoxysilane hydrochloride, allylethylenediaminopropyltrimethoxysilane, allylethylenediaminopropyltriethoxysilane, allyltrichlorosilane, allylmethyldichlorosilane, allyldimethylchlorosilane, allyltrimethoxysilane, allyltriethoxysilane, allylmethyldimethoxysilane, allyl methyldiethoxysilane, allyldimethyl methoxysilane, allyldimethylethoxysilane, divinyltetramethyldisilazane, divinyltetramethyldisiloxane, trimethyltrivinylcyclotrisiloxane, tetramethyltetravinylcyclotetrasiloxane, pentamethylpentavinylcyclopentasiloxane, and hexamethylhexavinylcyclohexasiloxane. An example that may be mentioned of silanes which can be used to modify the surface are phenyltrimethoxysilane, phenyltriethoxysilane, propyltrimethoxysilane, propyltriethoxysilane, 3-glycidyloxypropyltrimethoxysilane, hexamethyldisiloxane, hexamethyldisilazane, 3-aminopropyltrimethoxysilane, 3-aminopropylmethyldiethoxysilane, 3-aminopropyldimethylmethoxysilane, chloropropyltrimethoxysilane, chlorotrimethylsilane, di methylchlorosilane, methyltrimethoxysilane, trimethylmethoxysilane, methylhydrodimethoxysilane, dimethyldimethoxysilane, ethyltrimethoxysilane, ethyltriacetoxysilane, propyltrimethoxysilane, diisopropyldimethoxysilane, diisobutyldimethoxysilane, chloropropyltrimethoxysilane, chloropropylmethyldimethoxysilane, chloroisobutylmethyldimethoxysilane, trifluoropropyltrimethoxysilane, trifluoropropylmethyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane, mercaptopropyltrimethoxysilane, bis(triethoxysilylpropyl)disulfide, bis(triethoxysilylpropyl)tetrasulfide, mercaptopropylmethyldimethoxysilane, aminopropyltrimethoxysilane, m-aminophenyltrimethoxysilane, aminopropylmethyldiethoxysilane, phenylaminopropyltrimethoxysilane, aminoethylaminopropyltrimethoxysilane, aminoethylaminopropylmethyldimethoxysilane, glycidoxypropyltrimethoxysilane, glycidoxypropylmethyldimethoxysilane, epoxycyclohexylethyltrimethoxysilane.

The production of silanized SiO$_2$ particles having polymerizable groups on the surface is in principle already known in the prior art. By way of example, SiO$_2$ particles can be precipitated from silica sols and then silanized with organosilanes, for example vinylsilanes. Such a production process by way of precipitated silicas is described by way of example in EP 0 926 170 B1. Further examples are found in EP 1 366 112, EP 2 025 722, EP 08007625, EP 08007580, EP 08007581, and EP 08007582. Another possibility is described in J. Colloid Interface Sci 26:62 (1968). This is the so called Stöber synthesis of such nanoparticles.

The polymerizable groups on the surface of the $SiO_2$ particles can in particular comprise vinyl groups, allyl groups, hexenyl groups, acryloyl groups, and/or methacryloyl groups.

In another variant of the invention, at least two different polymerizable groups are arranged on the surface of the $SiO_2$ particles. The different polymerizable groups can preferably be methacryloyl, acryloyl, styryl, or itaconyl groups on the one hand, and vinyl, allyl, alkenyl, or crotonyl groups on the other hand. In particular, they can also comprise acryloyl and/or methacryloyl groups on the one hand and vinyl, hexenyl, and/or allyl groups on the other hand.

To produce this type of dual surface modification, the corresponding silanes and siloxanes, respectively, can be reacted in a mixture or in succession during the silanization of the $SiO_2$ particles.

The surface coverage of the $SiO_2$ particles with polymerizable groups is preferably from 0.01 to 6 groups/$nm^2$, more preferably from 0.02 to 4 groups/$nm^2$.

$SiO_2$ particles surface-functionalized with reactive, e.g. polymerizable, groups can act as crosslinking agents during the production of the polymer A, and can bring about chemical crosslinking. For the purposes of the invention, it is also possible to use $SiO_2$ particles which do not bring about any crosslinking, for example unmodified $SiO_2$ particles, or $SiO_2$ particles, surface-modified with unreactive groups. In these cases, it is preferable to use conventional crosslinking agents during the production of polymer A.

Besides the polymerizable groups, the $SiO_2$ particles can also bear groups which do not react in a polymerization. In particular, the modification of the $SiO_2$ particles should be such that in a 2-phase system, e.g. butyl acrylate-water, the $SiO_2$ particles remain in the butyl acrylate phase and do not agglomerate.

The surface area of the $SiO_2$ particles can be calculated from the particle size in the case of spherical particles. For calculation, the median of the particle size distribution (D50) is used. The specific surface area ($A_0$) can then be calculated by using the density of the particle ($\rho$):

$$A_0 = 6/(\rho \times D50)$$

The density of colloidal silicon dioxide is 2.1 $g/cm^3$.

The number of reactive groups per unit of surface area ($n_R^A$) is calculated from the quotient derived from the number of reactive groups ($n_R^M$) per unit of mass divided by the specific surface area:

$$n_R = (n_R^M / A_0)$$

The number of reactive groups per unit of mass $n_R^M$ can be determined by way of suitable analytical methods. If silanes of alkoxy, acyloxy, acetoxy, alkenoxy or oximosilane type are used in order to introduce the reactive groups onto the surface, a complete hydrolysis of the silane can be assumed. That means that all of the groups used are in turn found on the surface of the $SiO_2$ particles.

The number of polymerizable groups on the surface of the $SiO_2$ particle can also be determined by NMR spectroscopy or by means of DSC (differential scanning calorimetry). These methods can in particular be used when there are no suitable analytical methods available to determine reactive groups (for example determination of iodine number in the case of vinyl groups). In the case of DSC, the heat of polymerization is measured as a measure of the number of polymerizable groups on the surface of the $SiO_2$ particle. For said DSC determination, a defined amount of the surface-modified $SiO_2$ particles is treated with a standardized peroxide solution, and the heat of reaction is measured. The method is described by way of example in DE 36 32 215 A1.

The average size of the hybrid particles according to the invention is generally from 100 to 5000 nm, preferably from 150 to 2000 nm, more preferably from 200 to 1500 nm, and their shape is substantially spherical. $M_w/M_n$ for the particle size distribution of the hybrid particles is preferably >2.

The preferred hybrid particles have a central region which substantially consists of polymer A and of $SiO_2$ particles. Thereby, the $SiO_2$ particles have a substantially homogenous distribution in polymer A. The outer regions of the preferred hybrid particles essentially consist of polymer B and are substantially free of $SiO_2$ particles. Thereby, polymer B can by way of example form a shell around polymer A, or can be arranged in some other shape, e.g. a "raspberry" structure, around polymer A, too. Polymer B can penetrate to some extent into polymer A, thus giving regions, in particular in the marginal region of the central region formed by polymer A, in which both vinyl polymers are present next to one another. Subsequent (preferably physical) crosslinking of the hybrid particles by way of polymer B thus produces a particularly strong bond.

A hybrid particle generally comprises at least 10 $SiO_2$ particles, preferably at least 25 $SiO_2$ particles, particularly preferably 50 $SiO_2$ particles. The content of $SiO_2$ particles is from 1 to 40% by weight, preferably from 1 to 30% by weight, more preferably from 1 to 15% by weight, particularly preferably from 2 to 8% by weight.

The hybrid particle can comprise, alongside the abovementioned constituents, other components, e.g. UV stabilizers, antioxidants, lubricants, separating agents, tackifiers, adhesion promoters, leveling agents, solvents, or dyes soluble in organic substances.

The hybrid particles obtainable by the method according to the invention have particularly good mechanical properties. The hybrid particles do not only have particularly high tensile strength and tensile strain at break but also excellent resilience. Moreover, the properties of the hybrid particles can be adjusted over a wide range.

The hybrid particle can also be used as thermoplastically processable elastomers, known as TPEs. The hybrid particles can by way of example be processed in an injection-molding process to give elastomeric bodies. A feature of the moldings produced here is not only good mechanical properties but also particularly pleasant haptics. Another advantage of TPEs is their capability to be recycled.

The hybrid particles can also be used as coating agents. Thereby, the hybrid particles form a film which does not only comprise (color) pigments but also additives typical of paints and coatings, e.g. UV stabilizers, antioxidants, leveling agents, deaerating agents, adhesion promoters, and surfactants.

The hybrid particles can also be used in adhesives. Thereby, the hybrid particles can function as binders and do not only comprise inorganic fillers but also adhesion promoters and other additives typical of adhesives.

The hybrid particles can also be used in coating formulations based on (meth)acrylates in order to improve toughness, haptics, and sliding properties and frictional properties.

The hybrid particles can reduce brittleness in potting compositions, e.g. those based on epoxy or on cyanate ester.

The hybrid particles can also be used in sealants for the construction sector. Thereby, the following can be used alongside the hybrid particles: fillers, pigments, other polymers, UV stabilizers and antioxidants, adhesion promoters, and other components typical of sealants.

The hybrid particles can also be used as sealant material. The hybrid particles can not only have good mechanical properties but also good resistance to oil and to solvents.

Dispersion

The method according to the invention is suitable for obtaining the hybrid particles in the form of an aqueous dispersion. Said dispersion is likewise provided by the present invention. Advantageously, the dispersions obtained comprise little coagulate, preferably less than 1% by weight, particularly preferably below 0.1% by weight.

Optionally, the dispersion obtained by the method according to the invention can then be subjected to common purification steps, e.g. a filtration process.

The content of hybrid particles in the dispersions is generally from 20 to 70% by weight, preferably from 30 to 65% by weight, particularly preferably from 40 to 60% by weight, based in each case on the total weight of the dispersion. The dispersion generally comprises emulsifiers, e.g. anionic, cationic, amphoteric, or nonionic emulsifiers. Preference is given to anionic and non-ionic emulsifiers, and particular preference is given to anionic emulsifiers. Anionic emulsifiers include the sodium, potassium, and ammonium salts of fatty acids and sulfonic acids; the alkali metal salts of $C_{12}$-$C_{16}$-alkyl sulfates; ethoxylated and sulfated or sulfonated fatty alcohols; alkylphenols and sulfodicarboxylate esters. Nonionic emulsifiers include ethoxylated fatty alcohols and alkylphenols having from 2-150 ethylene oxide units per molecule. Cationic emulsifiers include ammonium, phosphonium, and sulfonium compounds having a hydrophobic moiety which by way of example is composed of one or more long alkyl chains. Preferred emulsifiers are alkylbenzene-sulfonates, dialkyl sulfosuccinates, Na $C_{14}$-$C_{16}$-alkylsulfonates salts, and Na dodecyl sulfate salts. The emulsifiers produced via ethoxylation and sulfation of alkylphenols have particularly good suitability. Examples are the derivatives of nonylphenol or triisobutylphenol having from 5 to 10 ethylene oxide units, e.g. 6-fold-ethoxylated triisobutylphenol, sulfated Na salt.

The dispersion according to the invention can comprise other components, e.g. polymers or surfactants, emulsifiers, pigments, inorganic fillers, dyes, stabilizers (UV, antioxidant), deaerating agents, preservatives, protective colloids, solvents, leveling agents, adhesion promoters, tackifiers, and other typical additives as used in dispersions. These can be added in the production method according to the invention or subsequently, in particular after a possible purification step.

One embodiment of the dispersion according to the invention exhibits various advantageous properties, e.g. a favorable film-formation temperature, which is generally in the range below 30° C., preferably below 20° C. The dispersion according to the invention is suitable for various applications, e.g. as adhesive, e.g. for steel, for aluminum, for glass, for plastics (PVC, PE, PP, polyurethanes) for construction materials (plasterboard), for stone, for leather, for rubbers, for glass-fiber composites, or for carbon fiber composites, or as sealant, e.g. in the construction industry or in the D.I.Y. sector. Another application is provided by coatings.

Polymeric Material

The present invention further provides a method for producing a polymeric material by removing the water from the dispersion according to the invention. This can be achieved easily by drying to concentrate the dispersion, e.g. by drying at room temperature or at an elevated temperature. It is preferable to dry the material at between 20 to 80° C. Residual water can be removed by way of example by tempering, for example at temperatures from 80 to 140° C., preferably at from 100 to 130° C. It is also possible to dry at reduced pressure.

Another option for producing the polymeric material, is to compress the dispersion according to the invention in an extruder, for example as described in DE 44 17 559. Thereby, the dispersion is separated in an extruder to give an aqueous phase and a polymer melt. This results in a particularly pure product since all of the auxiliaries dissolved in water are removed with the aqueous phase. Another option for producing the polymeric material, is to coagulate the dispersion according to the invention, e.g. by common coagulation processes, such as freeze coagulation or chemical coagulation, e.g. using polyvalent ions, such as aluminum ions. Spray drying of the dispersion is equally possible.

After removal of the water, the polymeric material comprising the hybrid particles is generally in a form that can be further processed, e.g. as powder or granulate. Said powder or granulate can be used to produce polymeric moldings, such as films, boards, and components, by further processing.

The polymeric material comprises the hybrid particles in uncrosslinked or crosslinked form. A preferred embodiment of the polymeric material that can be produced according to the invention comprises the hybrid particles in crosslinked, preferably physically crosslinked, form. Physical crosslinking means that a solid phase is built without the formation of chemical bonds. Thereby, it is preferred that the vinyl polymer B forms a phase which is substantially continuous between the phases of the vinyl polymer A. The regions of the hybrid particles composed of vinyl polymer A and of $SiO_2$ are therefore embedded into a continuous phase made of polymer B. Said continuous phase is substantially free of $SiO_2$ particles. Preferably, the distance between the regions comprising vinyl polymer A and $SiO_2$ particles in the material is from 20 to 250 nm.

In a preferred embodiment, the polymeric material that can be produced according to the invention has advantageous properties such as favorable tensile strain at break which is generally >200%, preferably >300%, tensile strength which is generally >4 MPa, preferably >5 MPa, an E-modulus between 0.3 and 3 MPa, or Shore hardness between 20 and 90 Shore A.

The polymeric material can be used for various applications, e.g. as thermoplastic elastomer, as gasket, as foil, as adhesive foil, as material for components, and as carrier film.

EXAMPLES

Detailed Description of Preferred Embodiments

The invention is explained below by some examples according to the invention, having no limiting effect at all. First, the test methods used subsequently will be described.

The solids content of the dispersion was determined by measuring the mass difference prior to and after drying for 2 hours at 120° C.

Tensile properties (tensile strain at break, tensile strength, E-modulus (at 100% tensile strain)) were determined by a method using test specimens based on DIN 53504/ISO 37 (S2) in a tensile tester from Zwick company. The test velocity was 200 mm/min.

For evaluation, at least 3 test specimens were tested, and the average value was calculated.

Shore hardness was determined in accordance with DIN 53505.

Glass transition temperatures Tg were determined by DMTA in a Haake Mars II rheometer with low-temperature device and solids clamp. Torsion was introduced into the system with constant amplitude (depending on material and on specimen thickness but in the linear viscoelastic region) with a frequency of 1 Hz.

SiO$_2$ particle size was determined in the liquid phase by means of dynamic light scattering in a "Dynamic Light Scattering Particle Size Analyzer LB-550" from Horiba company at a concentration of 10% by weight maximum of particles, the dynamic viscosity of the dispersion being <3 mPas at 25° C. The particle size stated is the median (D50 value) of the particle size distribution.

Example 1

A fine-particle emulsion is produced in an UltraTurrax from 0.43 g of dilauroyl peroxide, 46 g of butyl acrylate, 25 g of dispersion of colloidal SiO$_2$ particles (30% by weight in butyl acrylate, spherical 25 nm particles, agglomerate-free, surface unreactively modified, no double bonds on the surface), 0.5 g of allyl methacrylate, 0.3 g of sodium salts of C$_{14}$-C$_{16}$-alkanesulfonic acids, and 58 g of water, by emulsification for 15 s at 24 000 rpm.

The resultant emulsion is then transferred into a reactor comprising an aqueous phase which is heated to 80° C. and made of 0.1 g of the abovementioned emulsifier in 150 g of water, and is stirred slowly at 80° C. under inert gas. The polymerization is complete after 1 h. Then, an emulsion composed of 0.44 g of methacrylic acid, 21.2 g of MMA, 21.2 g of butyl acrylate, 0.075 g of potassium peroxodisulfate, 0.04 g of sodium salts of C$_{14}$-C$_{16}$-alkanesulfonic acids, and 30.5 g of water, produced by emulsification for 15 s at 24,000 rpm in an UltraTurrax is added dropwise within 1 h. Stirring is then continued at 80° C. for 1 h, and the mixture is neutralized by addition of 0.4 g of 25% ammonia solution. Cooling and filtration results in a stable aqueous dispersion with a solids content of 31%. The size of the resultant hybrid particles is about 1 μm. The dispersion has film-forming properties at room temperature.

To produce films, the dispersion was poured into a dish and dried at room temperature for 5 days. The films were tempered at 120° C. for 2 hours and exhibit the following mechanical properties:

| Tensile strength [MPa] | 5.69 |
| Tensile strain at break [%] | 386 |
| E-modulus [MPa] | 0.34 |
| Shore A hardness | 62 |

Example 2

A fine-particle emulsion is produced in an UltraTurrax from 0.44 g of dilauroyl peroxide, 46 g of butyl acrylate, 25 g of dispersion of colloidal SiO$_2$ particles (30% by weight in butyl acrylate, spherical 25 nm particles, agglomerate-free, surface reactively modified with 3-methacryloxypropyltrimethoxysilane), 0.3 g of sodium salts of C$_{14}$-C$_{16}$-alkanesulfonic acids, and 58 g of water, by emulsification for 15 s at 24 000 rpm.

The resultant emulsion is then transferred into a reactor comprising an aqueous phase which has been heated to 80° C. made of 0.1 g of the abovementioned emulsifier in 150 g of water, and is stirred slowly at 80° C. under inert gas. The polymerization is complete after 1 h. Then, an emulsion composed of 0.44 g of methacrylic acid, 21.2 g of MMA, 21.2 g of butyl acrylate, 0.075 g of potassium peroxodisulfate, 0.04 g of sodium salts of C$_{14}$-C$_{16}$-alkanesulfonic acids, and 30.5 g of water, produced by emulsification for 15 s at 24,000 rpm in an UltraTurrax is added dropwise within 1 h. Stirring is then continued at 80° C. for 1 h, and the mixture is neutralized by addition of 0.4 g of 25% ammonia solution. Cooling and filtration results in a stable aqueous dispersion with a solids content of 31%. The size of the resultant hybrid particles is about 0.5 μm. The dispersion has film-forming properties at room temperature.

To produce films, the dispersion was poured into a dish and dried at room temperature for 5 days. The films were tempered at 120° C. for 2 hours and exhibit the following mechanical properties:

| Tensile strength [MPa] | 6.04 |
| Tensile strain at break [%] | 403 |
| E-modulus [MPa] | 0.54 |
| Shore A hardness | 50 |

Example 3

A fine-particle emulsion is produced from 2.15 g of dilauroyl peroxide, 77.42 g of MMA, 115.48 g of butyl acrylate, 163.6 g of dispersion of colloidal SiO$_2$ particles (30% by weight in butyl acrylate, spherical 25 nm particles, agglomerate-free, surface reactively modified with 3-methacryloxypropyltrimethoxysilane), 1.6 g of sodium salts of C$_{14}$-C$_{16}$-alkanesulfonic acids, and 282.5 g of water, by emulsification (60 s at 24,000 rpm in an UltraTurrax). This emulsion is added to an initial charge of 750 g of water and 0.5 g of sodium salts of C$_{14}$-C$_{16}$-alkanesulfonic acids, which has been preheated to 80° C., and polymerized at 80° C. within 60 min, under slow stirring. An emulsion produced from 2.15 g of methacrylic acid, 106 g of MMA, 106 g of butyl acrylate, 0.2 g of sodium salts of C$_{14}$-C$_{16}$-alkanesulfonic acids, 0.25 g of potassium peroxodisulfate, and 152.5 g of water is then immediately added to the mixture at 80° C. and within 90 min. Stirring is then continued at 80° C. for 1 h. Finally, the dispersion is neutralized by addition of 2 g of 25% ammonia solution. This results in an aqueous dispersion with a solids content of 32%. The dispersion has film-forming properties at room temperature.

To produce films, the dispersion was poured into a dish and dried at room temperature for 5 days. In part, the properties of the resultant films were tested directly, and in part the films were tempered for 2 hours at 120° C. prior to testing. The films exhibit two glass transition temperatures and the following mechanical properties:

|  | Without tempering | With tempering |
| --- | --- | --- |
| Tensile strength [MPa] | 8.0 | 7.8 |
| Tensile strain at break [%] | 382 | 397 |
| E-modulus [MPa] | 0.60 | 0.53 |
| Shore A hardness | 41 | 37 |
| T$_g$1 [° C.] | −2.2 | −1.5 |
| T$_g$2 [° C.] | 37.5 | 37.8 |

Example 4

A fine-particle emulsion is produced in an UltraTurrax from 2.15 g of dilauroyl peroxide, 77.42 g of MMA, 115.48 g of butyl acrylate, 163.6 g of dispersion of colloidal SiO$_2$ particles (30% by weight in butyl acrylate, spherical 25 nm particles, agglomerate-free, surface reactively modified with 3-methacryloxypropyltrimethoxysilane), 1.6 g of sodium salts of $C_{14}$-$C_{16}$-alkanesulfonic acids, and 282.5 g of water, by emulsification for 60 s at 24,000 rpm. This emulsion is added to an initial charge of 400 g of water and 0.5 g of sodium salts of $C_{14}$-$C_{16}$-alkanesulfonic acids, and polymerized at 80° C. within 60 min to give a microsuspension. An emulsion produced from 2.15 g of methacrylic acid, 106 g of MMA, 106 g of butyl acrylate, 0.2 g of sodium salts of $C_{14}$-$C_{16}$-alkanesulfonic acids, 0.25 g of potassium peroxodisulfate, and 152.5 g of water is then immediately added to the mixture at 80° C. and within 90 min. Stirring is then continued at 80° C. for 1 h. Finally, the dispersion is neutralized by addition of 2 g of 25% ammonia solution. This results in an aqueous dispersion with a solids content of 40.3%. The dispersion has film-forming properties at room temperature.

To produce films, the dispersion was poured into a dish and dried at room temperature for 5 days. The films exhibit the following mechanical properties:

| Tensile strength [MPa] | 6.1 |
|---|---|
| Tensile strain at break [%] | 382 |
| E-modulus [MPa] | 0.43 |
| Shore A hardness | 34 |

Example 5

A fine-particle emulsion is produced from 2.15 g of dilauroyl peroxide, 153.76 g of MMA, 39.24 g of butyl acrylate, 163.60 g of dispersion of colloidal $SiO_2$ particles (30% by weight in butyl acrylate, spherical 25 nm particles, agglomerate-free, surface reactively modified with 3-methacryloxypropyltrimethoxysilane), 1.6 g of sodium salts of $C_{14}$-$C_{16}$-alkanesulfonic acids, and 282.5 g of water, by emulsification (60 s at 24,000 rpm in an UltraTurrax). This emulsion is added to an initial charge of 750 g of water and 0.5 g of sodium salts of $C_{14}$-$C_{16}$-alkanesulfonic acids, and polymerized at 80° C. within 60 min resulting in a microsuspension. An emulsion produced from 2.19 g of methacrylic acid, 106 g of MMA, 106 g of butyl acrylate, 0.2 g of sodium salts of $C_{14}$-$C_{16}$-alkanesulfonic acids, 0.25 g of potassium peroxodisulfate, and 152.5 g of water is then immediately added to the mixture at 80° C. and within 90 min. Stirring is then continued at 80° C. for 1 h. Finally, the dispersion is neutralized by addition of 2 g of 25% ammonia solution. This results in an aqueous dispersion with a content of 32% of hybrid particles. The dispersion has film-forming properties at room temperature.

To produce films, the dispersion was poured into a dish and dried at room temperature for 5 days. The films exhibit the following mechanical properties:

| Tensile strength [MPa] | 15.8 |
|---|---|
| Tensile strain at break [%] | 290 |
| E-modulus [MPa] | 2.57 |
| Shore A hardness | 71 |

Example 6

A fine-particle emulsion is produced from 2.2 g of dilauroyl peroxide, 170 g of butyl acrylate, 60 g of styrene, 132 g of dispersion of colloidal $SiO_2$ particles (30% by weight in butyl acrylate, spherical 25 nm particles, agglomerate-free, surface reactively modified with 3-methacryloxypropyltrimethoxysilane), 1.6 g of sodium salts of $C_{14}$-$C_{16}$-alkanesulfonic acids, and 281 g of water, by emulsification (60 s at 24,000 rpm in an UltraTurrax).

Said emulsion is added to an initial charge of 0.5 g of sodium salts of $C_{14}$-$C_{16}$-alkanesulfonic acids in 805 g of water, which has been heated to 80° C., and is polymerized at 80° C. within 60 min under inert gas. An emulsion produced from 200 g of MMA, 4.2 g of butyl acrylate, 0.45 g of 2-ethylhexyl thioglycolate, 0.15 g of sodium salts of $C_{14}$-$C_{16}$-alkanesulfonic acids, 0.43 g of sodium peroxodisulfate, and 153 g of water by emulsification for 30 s at 24,000 rpm in an UltraTurrax is then immediately added to the mixture at 80° C. within 60 min. Stirring is then continued at 80° C. for 1 hour. This results in a dispersion with a particle size of about 0.5 µm and a solids content of 30%.

The dispersion is filled into PE bottles and frozen at −25° C. After thawing, in each PE bottle a white, elastic block is obtained from which the water can be removed by compression. Drying results in white plastic bodies, which can be formed at 150° C. to transparent, tough plastics sheets.

Example 7

A fine-particle emulsion is produced from 0.4 g of dilauroyl peroxide, 45 g of butyl acrylate, 24 g of a dispersion of colloidal $SiO_2$ particles (30% by weight in MMA, spherical 25 nm particles, agglomerate-free, surface reactively modified with 3-methacryloxypropyltrimethoxysilane), 0.4 g of sodium salts of $C_{14}$-$C_{16}$-alkanesulfonic acids, and 60 g of water, by emulsification (15 s at 20,000 rpm in an UltraTurrax). This is added to an initial charge of 250 g of water and 0.1 g of $C_{14}$-$C_{16}$-alkanesulfonic acids, which has been preheated to 80° C., and is polymerized at 80° C. within 50 min, with slow stirring. An emulsion produced from 40 g of MMA, comprising 0.2% of 2-ethylhexyl thioglycolate, 0.03 g of $C_{14}$-$C_{16}$-alkanesulfonic acids, 0.05 g of potassium peroxodisulfate, and 30 g of water is then immediately added to the mixture at 80° C. within 1 hour. Stirring is then continued at 80° C. for 1 h. This results in a coagulate-free dispersion with a particle size of about 0.5 µm and a solids content of 23%. Freeze coagulation results in a white powder.

Example 8

The procedure is as in example 7, but a different monomer constitution is selected in the $1^{st}$ stage: 34 g of butyl acrylate and 34 g of dispersion of colloidal $SiO_2$ particles (33% by weight in butyl acrylate, spherical 25 nm particles, agglomerate-free, surface reactively modified with 3-methacryloxypropyltrimethoxysilane and vinyl-trimethoxysilane). This results in a dispersion with a particle size in the range from 0.5 to 1 µm. The solids content of the dispersion is 22% by weight. Freeze coagulation results in a white powder.

What is claimed is:
1. A method for producing a hybrid particle comprising polymer and $SiO_2$ particles, wherein
 a) a water-insoluble phase comprising one or more monomers and colloidal $SiO_2$ particles with an average particle size from 1 to 150 nm is polymerized in a first polymerization stage in an aqueous medium, and
 b) in a second polymerization stage in an aqueous medium, one or more monomers is/are polymerized in the presence of the polymer obtained in the first polymerization stage, said polymerization stage a) is carried out as batch polymerization and polymerization stage b) is carried out as feed polymerization, wherein polymerization stages a) and b) result in polymers differing from one another in composition.

2. The method according to claim 1, in which two or more monomers each are used in polymerization stage a) and in polymerization stage b).

3. The method Method according claim 1, in which a monomer-soluble initiator is used in polymerization stage a).

4. The method according to claim 3, in which the polymer is chemically crosslinked in the first polymerization stage.

5. The method according to claim 4, in which, in polymerization stage b), an aqueous emulsion of the monomers is added to the polymer obtained in polymerization stage a).

6. The method according to claim 5, in which a water-soluble initiator is used in polymerization stage b).

7. The method according to claim 6, in which the average size of the water-soluble phase is in the range from 100 to 5000 nm, preferably from 150 to 2000 nm, particularly preferably between 200 and 1500 nm.

8. The method according to claim 7, in which monomers used comprise vinyl monomers.

9. The method according to claim 8, in which two or more acrylate monomers and/or methacrylate monomers are used in polymerization stage a) and in polymerization stage b).

10. The method according to claim 9, in which monomers used in polymerization stage a) and in polymerization stage b) comprise i) methyl methacrylate and ii) methyl acrylate, ethyl acrylate, butyl acrylate, and/or ethyihexyl acrylate.

11. The method according to claim 10, in which the methyl methacrylate monomer content of the polymer obtained in polymerization stage a) is lower than that of the polymer obtained in polymerization stage b).

12. The method according to claim 11, in which the $SiO_2$ particles have been surface-modified via unreactive and/or reactive groups.

13. The method according to claim 1 in which the average size of the $SiO_2$ particles is from 2 to 100 nm, preferably from 3 to 75 nm, more preferably from 4 to 50 nm, more preferably from 5 to 30 nm.

14. An aqueous polymer dispersion obtained by the method according to claim 13.

15. A method for producing a polymeric material, wherein the water is removed from an aqueous dispersion according to claim 14.

16. The method according to claim 7, wherein the vinyl monomers are selected from the group of the vinyl halides, vinyl esters, styrene and substituted styrenes, acrylic and methacrylic acid, and derivatives thereof.

17. The method according to claim 7, wherein the vinyl monomers are selected from the group of the vinyl esters, styrene and substituted styrenes, and acrylic and methacrylic acids, and esters thereof.

* * * * *